(12) United States Patent
Tang et al.

(10) Patent No.: US 6,775,717 B1
(45) Date of Patent: Aug. 10, 2004

(54) METHOD AND APPARATUS FOR REDUCING LATENCY DUE TO SET UP TIME BETWEEN DMA TRANSFERS

(75) Inventors: Ming Tang, San Jose, CA (US); Jiann Liao, Campbell, CA (US)

(73) Assignee: Integrated Device Technology, Inc., Santa Clara, CA (US)

( * ) Notice: Subject to any disclaimer, the term of this patent is extended or adjusted under 35 U.S.C. 154(b) by 85 days.

(21) Appl. No.: 10/177,382

(22) Filed: Jun. 21, 2002

Related U.S. Application Data

(60) Provisional application No. 60/316,399, filed on Aug. 31, 2001.

(51) Int. Cl.$^7$ .................................................. G06F 3/00
(52) U.S. Cl. ........................... 710/22; 710/39; 710/113; 712/225; 711/112; 711/168
(58) Field of Search ................................ 710/1, 20, 22, 710/23–28, 33, 36, 35, 58, 72, 31, 39, 113, 119; 712/225; 711/100, 112, 113, 168

(56) References Cited

U.S. PATENT DOCUMENTS

| | | | | |
|---|---|---|---|---|
| 5,245,575 A | * | 9/1993 | Sasaki et al. | 365/189.12 |
| 5,423,020 A | * | 6/1995 | Vojnovich | 395/425 |
| 5,630,171 A | * | 5/1997 | Chejlava, Jr. et al. | 395/843 |
| 5,900,865 A | * | 5/1999 | Howe | 345/191 |
| 6,055,583 A | * | 4/2000 | Robbins | 710/22 |
| 6,108,722 A | * | 8/2000 | Troeller et al. | 710/26 |

* cited by examiner

Primary Examiner—Fritz Fleming
Assistant Examiner—RiJue Mai
(74) Attorney, Agent, or Firm—Victor H. Okumoto

(57) ABSTRACT

A method and apparatus for reducing latency due to set up time between DMA transfers are described. The method comprises initiating arbitration of DMA channel requests prior to completion of a current DMA transfer; and initiating set up for a next DMA transfer prior to completion of the current DMA transfer according to the arbitration. One implementation of the apparatus includes one or more DMA channel interfaces providing a series of DMA channel requests such that a DMA channel request for a next DMA transfer is provided before a current DMA transfer is completed; and a DMA controller that initiates arbitration of DMA channel requests after they are provided by the one or more DMA channel interfaces and before the current DMA transfer is completed, and initiates set up for the next DMA transfer prior to completion of the current DMA transfer according to the arbitration.

31 Claims, 9 Drawing Sheets

METHOD AND APPARATUS FOR REDUCING LATENCY DUE TO SET UP TIME BETWEEN DMA TRANSFERS

CROSS REFERENCE TO RELATED APPLICATIONS

This application claims priority to U.S. provisional application Ser. No. 60/316,399 filed Aug. 31, 2001.

FIELD OF THE INVENTION

The present invention generally relates to direct memory access ("DMA") and in particular, to a method and apparatus for reducing latency due to set up time between DMA transfers.

BACKGROUND OF THE INVENTION

FIGS. 1 and 2 illustrate a conventional DMA technique performed by a conventional DMA controller, resulting in latency due to set up time between DMA transfers. As shown in FIG. 1, in 102, if a DMA grant is received from an arbiter that arbitrates DMA requests from multiple DMA channel interfaces, then, in 103, a DMA transfer through the winning DMA channel interface is initiated by first performing conventional set up activities before transferring data. In 104–106, the DMA transfer is then performed. If a transmission error occurs before completion of the DMA transfer, then in 105, the DMA transfer is aborted and in 101, the DMA controller goes into an idle state waiting for the next DMA grant. On the other hand, in 106, if the DMA transfer happens to finish error free, then jumping back to 101, the DMA controller goes into an idle state waiting for the next DMA grant so that each of 102–106 can once again be performed for a next DMA transfer.

As shown in FIG. 2, the conventional DMA technique for the conventional DMA controller results in latency due to set up time between DMA transfers. The latency has two components. The first component is a set up time T1 associated with the DMA controller which represents a delay between the time that the DMA controller receives the DMA grant from the arbiter and the time that address and command information is provided to a memory controller controlling a memory participating in the DMA. The second component is a set up time T2 associated with the memory and memory controller which represents a delay between the time the memory controller receives the address and command information from the DMA controller and the time that data is read from or written to the memory in response to the address and command information.

Procedurally, a first grant is received, and after set up delay T1, address and command information are provided to the memory controller. The memory controller then provides the address and command information to a memory, and after another set up delay T2, data is read from or written to the memory. At the end of the DMA transfer, a done indication is generated, and in response, the arbiter performs another arbitration, resulting in a second grant to the same or another DMA channel. The second DMA transfer then goes through the same set up times T1 and T2 before data is transferred between the memory and the DMA channel interface participating in the second DMA transfer.

As can be readily appreciated, repetitions of the set up times T1 and T2 between successive DMA transfers considerably slows down the transmission rate through the DMA channels, thus reducing the benefits of high speed DMA channel interfaces.

OBJECTS AND SUMMARY OF THE INVENTION

Accordingly, it is an object of the present invention to provide a method for reducing latency due to set up time between DMA transfers.

Another object is to provide an apparatus for reducing latency due to set up time between DMA transfers.

These and additional objects are accomplished by the various aspects of the present invention, wherein briefly stated, one aspect is a method for reducing latency due to set up time between DMA transfers, comprising: initiating arbitration of DMA channel requests prior to completion of a current DMA transfer; and initiating set up for a next DMA transfer prior to completion of the current DMA transfer according to the arbitration so as to reduce latency due to set up time between the current DMA transfer and the next DMA transfer.

Another aspect is a method for reducing latency due to set up time between DMA transfers, comprising: arbitrating pending DMA channel requests before completion of a current DMA transfer; setting up for a next DMA transfer prior to completion of the current DMA transfer according to the arbitration; and performing the next DMA transfer immediately after completion of the current DMA transfer provided the setting up for the next DMA transfer has completed.

Still another aspect is an apparatus for reducing latency due to set up time between DMA transfers, comprising: a DMA channel interface providing a series of DMA channel requests such that a DMA channel request for a next DMA transfer is provided by the DMA channel interface before a current DMA transfer is completed; and a DMA controller initiating arbitration of DMA channel requests after the DMA channel request for the next DMA transfer is provided by the DMA channel interface and before the current DMA transfer is completed, and initiating set up for the next DMA transfer prior to completion of the current DMA transfer according to the arbitration so as to reduce latency due to set up time between the current DMA transfer and the next DMA transfer.

Yet another aspect is an apparatus for reducing latency due to set up time between DMA transfers, comprising: a first DMA channel interface participating in a current DMA transfer; a second DMA channel interface providing a DMA channel request for a next DMA transfer before the current DMA transfer is completed; and a DMA controller initiating arbitration of DMA channel requests after the DMA channel request for the next DMA transfer is provided by the second DMA channel interface and before the current DMA transfer is completed, and initiating set up for the next DMA transfer prior to completion of the current DMA transfer according to the arbitration so as to reduce latency due to set up time between the current DMA transfer and the next DMA transfer.

Additional objects, features and advantages of the various aspects of the present invention will become apparent from the following description of its preferred embodiment, which description should be taken in conjunction with the accompanying drawings.

DETAILED DESCRIPTION OF THE PREFERRED EMBODIMENT

FIGS. 3–6 illustrate, as an example, a flow diagram of a method for reducing latency due to set up time between DMA transfers. Two state machines included in a DMA controller preferably perform the method. A main state machine ("MSM") performs the portion of the method described below in reference to FIGS. 3–5, and a secondary state machine ("SSM") performs the portion of the method described below in reference to FIG. 6.

Figure 1:
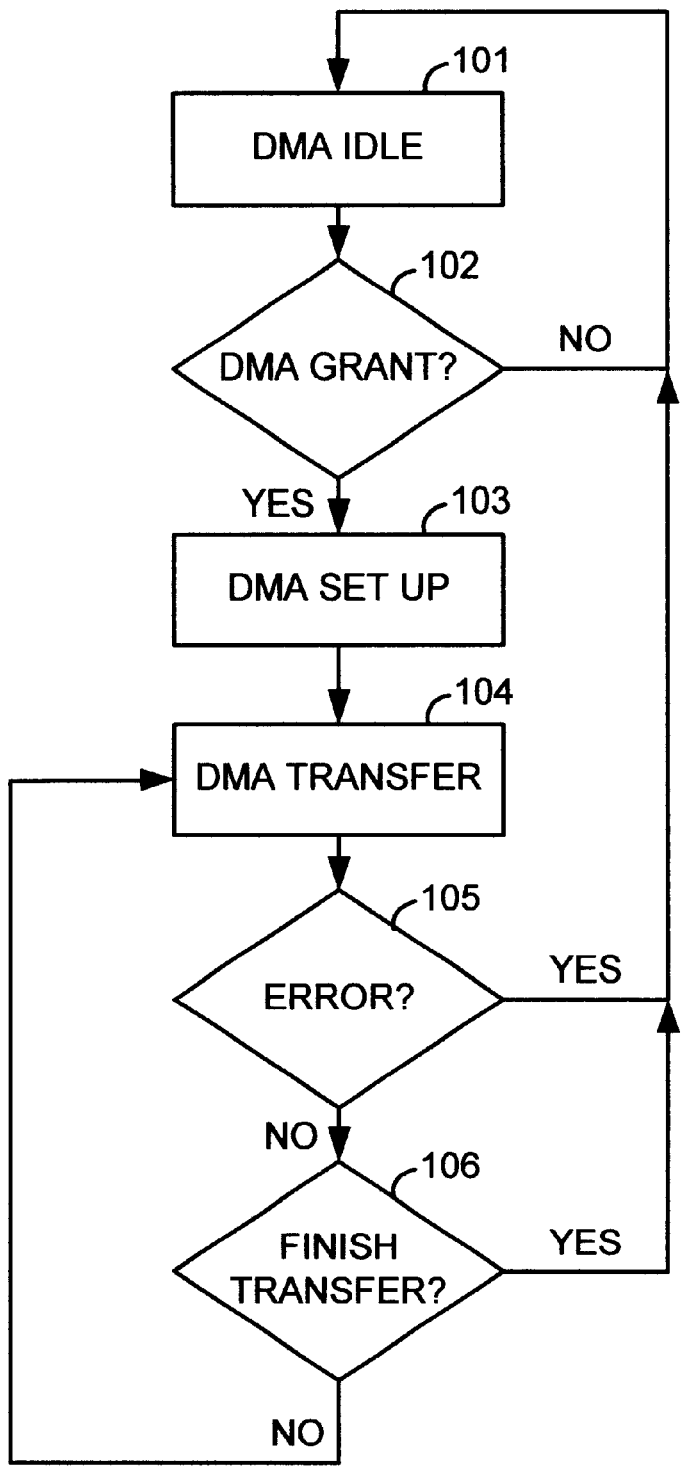
FIG. 1 illustrates, as an example, a flow diagram of a conventional method for performing DMA transfers.
Figure 2:
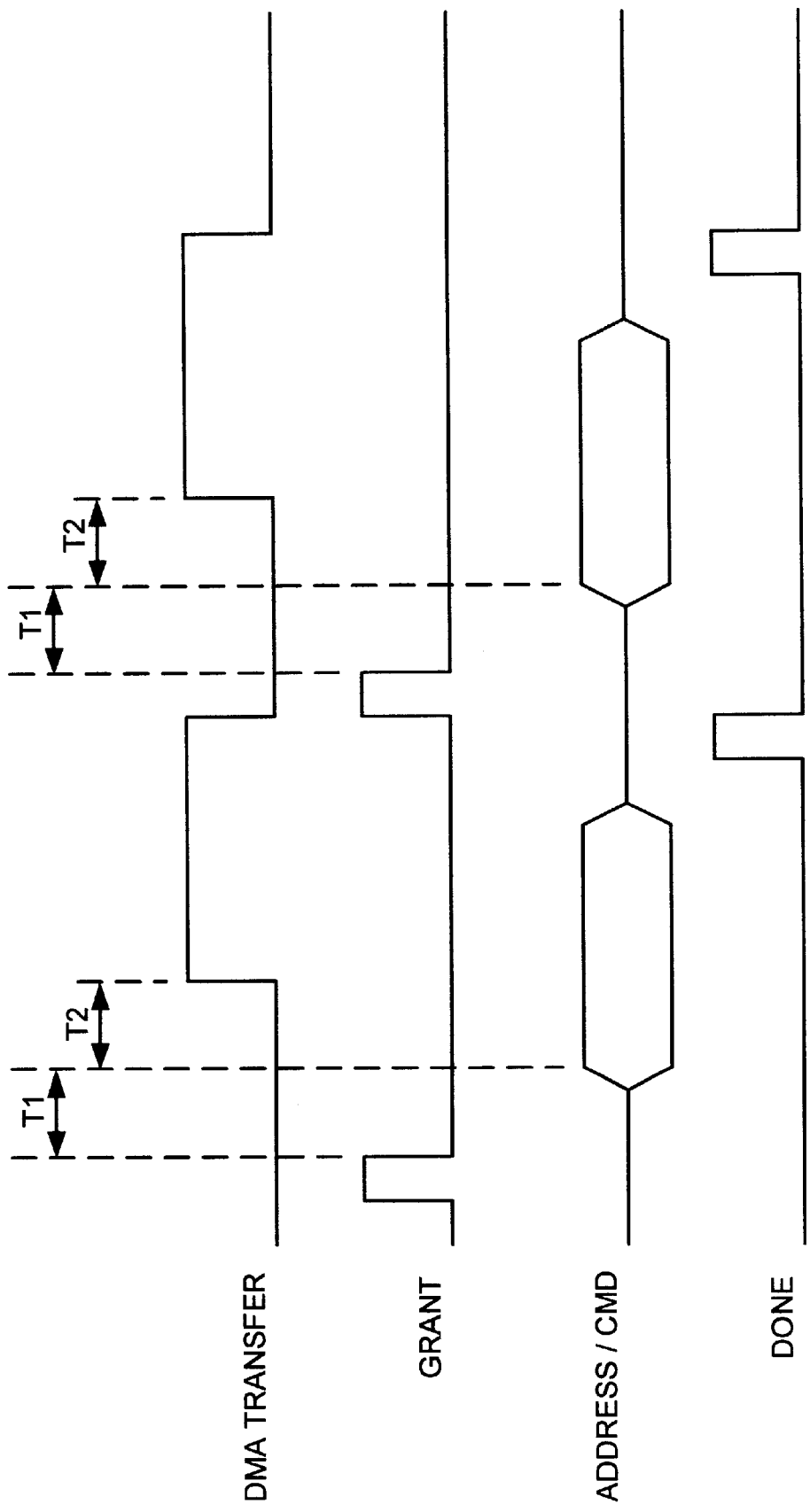
FIG. 2 illustrates, as an example, timing diagrams corresponding to a flow diagram of a conventional method for performing DMA transfers.
Figure 3:
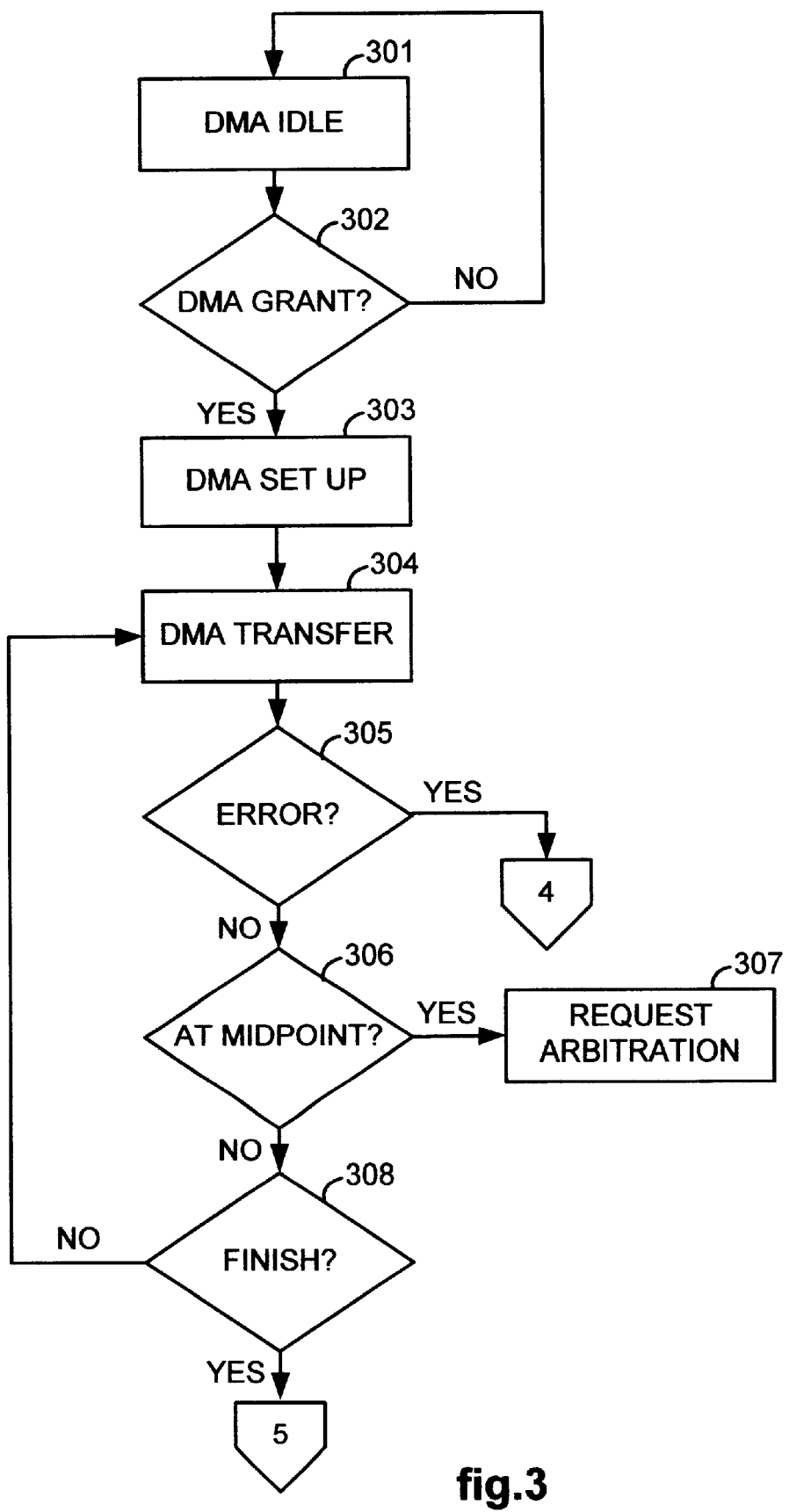
FIGS. 3–6 illustrate, as an example, a flow diagram of a method for reducing latency due to set up time between DMA transfers, utilizing aspects of the present invention.

In 302 of FIG. 3, the method checks to see whether a grant is received from a conventional arbiter that arbitrates DMA requests from DMA channel interfaces such as a peripheral controller interface, one or more Ethernet controller interfaces, and other DMA requesting DMA channel interfaces. If no grant is received, then in 301, the DMA remains idle, but if a grant is received, then in 303, set up of the first DMA transfer for the grant winning DMA channel interface is performed in a conventional fashion.

After completion of the set up, in 304, a current DMA transfer is initiated, and proceeds by looping through 304–308 until the current DMA transfer is completed. Preferably, the current and subsequent DMA transfers comprise DMA bursts of one or more words, up to a maximum number, such as sixteen words, wherein each word may be one or more bytes long according to convention.

During the DMA transfer, in 306, a determination is made when an arbitration requesting point in the current DMA transfer is reached. One example of such an arbitration requesting point is a point that is approximately the midpoint of the current DMA transfer. Upon determining that the arbitration requesting point has been reached, in 307, arbitration of DMA channel requests is then initiated prior to completion of the current DMA transfer. This arbitration request is referred to as a "pre-request", because of its timing in the current DMA transfer.

Also during the DMA transfer, in 305, for example, the current DMA transfer is monitored for transmission errors. If a transmission error is detected, then in 401 of FIG. 4, it is first determined whether or not the current DMA transfer has passed the arbitration requesting point (e.g., the midpoint of the current DMA transfer). If a transmission error is detected before the arbitration requesting point, then the method jumps back to 301 of FIG. 3, so that the current DMA transfer is aborted and the DMA goes back to idle until another DMA grant is received from the arbiter. On the other hand, if a transmission error is detected after the arbitration requesting point in this flow, then, in 402, it is determined whether a next DMA grant is ready. If NO, then the method jumps back to 301 of FIG. 3, so that the current DMA transfer is aborted and the DMA goes back to idle until another DMA grant is received from the arbiter. On the other hand, if YES, then in 403, it is determined whether the next DMA grant for the next DMA transfer will be for the same DMA channel as the current DMA transfer or another DMA channel. If the next DMA grant is for the same DMA channel, then the method jumps back to 301 of FIG. 3, so that the current DMA transfer is aborted and the DMA goes back to idle until another DMA grant is received from the arbiter. If the next DMA grant is for a different DMA channel, however, then, in 404, it is determined whether or not the set up for the next DMA transfer is ready yet. If the set up is ready, then the method jumps back to 304 of FIG. 3 to initiate DMA transfer for the next DMA transfer (which now becomes the current DMA transfer). If the set up is not ready, however, then the method waits until it is ready before jumping back to 304 to initiate the DMA transfer for the next DMA transfer.

Figure 5:
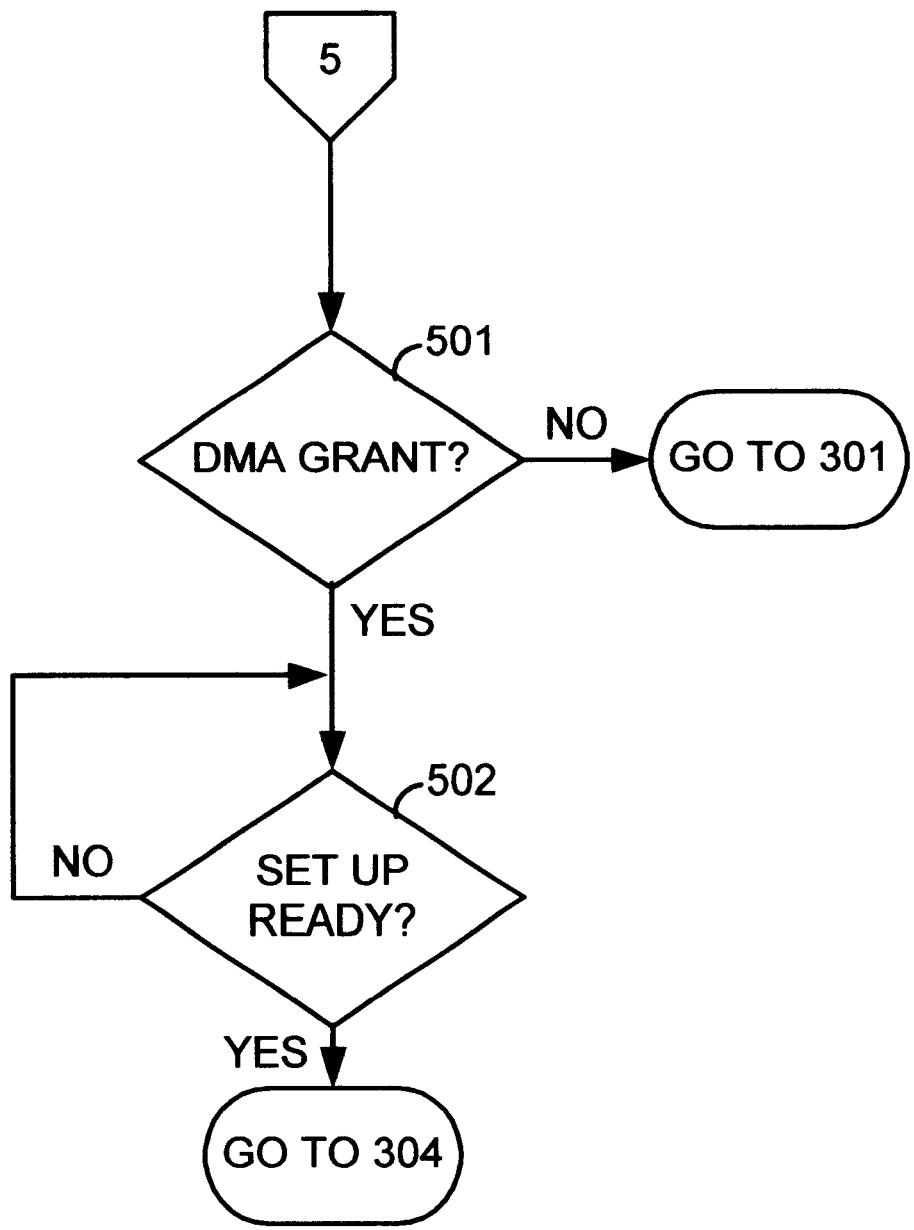

In 308, if the current DMA transfer finishes without a transmission error, then in 501 of FIG. 5, the method checks to see if a DMA grant resulting from a pre-request during the current DMA transfer has already been received from the arbiter. Since the timing of the pre-request is selected such that its corresponding DMA grant should be received from the arbiter before or very soon after completion of the current DMA transfer, normally, it should be available at this time. Therefore, if the grant has not already been received, then the method jumps back to 301 of FIG. 3, so that the current DMA transfer is aborted and the DMA goes back to idle until another DMA grant is received from the arbiter. On the other hand, if the grant has been received, the method proceeds, in 502, by checking whether the set up for the DMA grant's corresponding pre-request is ready. Since the timing of the pre-request is selected such that set up for a next DMA transfer should be ready before or very soon after completion of the current DMA transfer, normally, it should be ready at this time. If the set up is ready, the method jumps back to 304 of FIG. 3 to initiate DMA transfer for the next DMA transfer (which now becomes the current DMA transfer). On the other hand, if the set up is not ready yet, then the method waits for the set up to be ready before jumping back to 304 of FIG. 3 to initiate DMA transfer for the next DMA transfer. In this manner, the set up time experienced by 303 of FIG. 3 is avoided for the next DMA transfer, thus reducing latency between DMA transfers due to such set up time.

Figure 6:
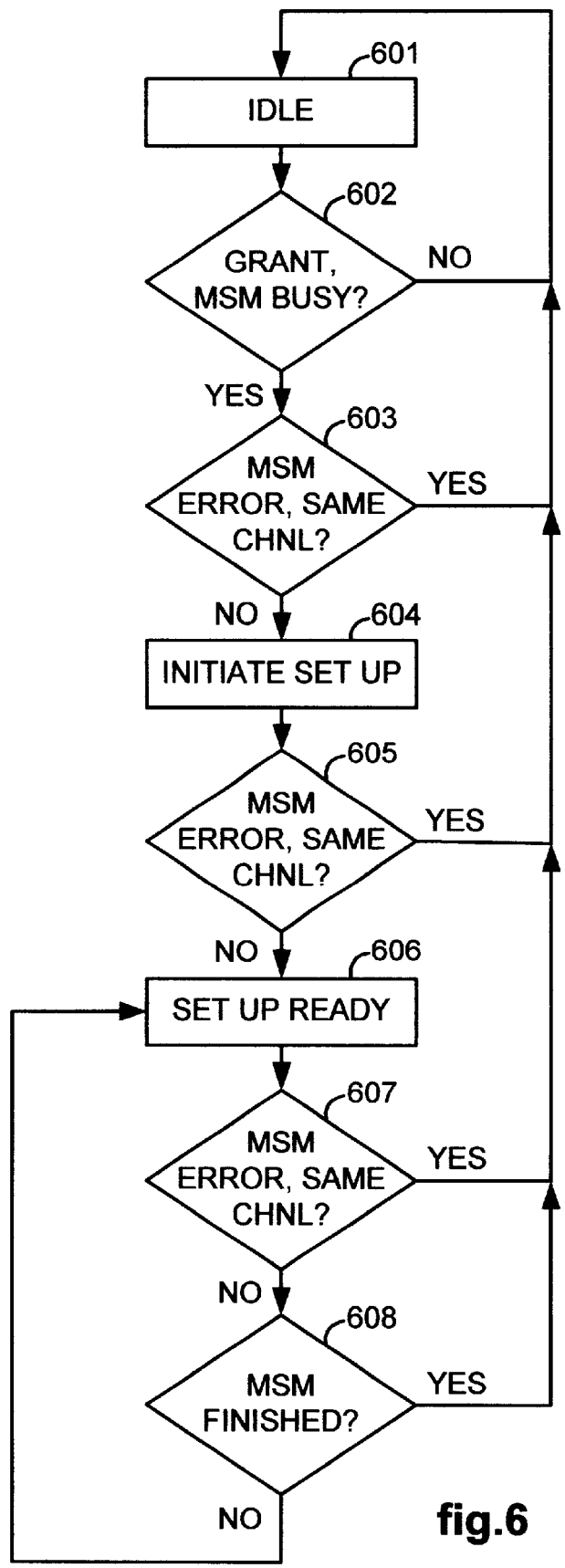

As previously explained, the secondary state machine ("SSM") preferably performs 601–608 of FIG. 6 to set up for a next DMA transfer according to a grant received from the arbiter in response to the pre-request initiated by the MSM in 307 of FIG. 3. The SSM preferably performs this function while the MSM is performing its tasks such as described in reference to FIGS. 3–5. In 602, if a DMA grant is received while the MSM is busy (i.e., not at DMA idle 301 of FIG. 3), then the SSM responds to the grant by proceeding to 603. Otherwise, the SSM remains idle in 601.

In 603, the SSM checks to see if the MSM detected a transmission error in the current DMA transfer up to this point. It also checks to see if the received grant is for the same DMA channel. If the determinations in 603 are YES to both, then the SSM aborts the set up, and jumps back to 601 to go back to being idle. On the other hand, if no transmission error has been detected in the current DMA transfer up to this point, or a transmission error has been detected, but the DMA grant is for another DMA channel than the DMA channel participating in the current DMA transfer, then the SSM proceeds, and in 604, initiates set up for the next DMA transfer according to the received DMA grant from the arbiter.

In 605, the SSM again checks to see if the MSM detected a transmission error in the current DMA transfer up to this point, and if the received grant is for the same DMA channel. If the determinations in 605 are YES to both, then the SSM aborts the set up, and jumps back to 601 to go back to being idle. On the other hand, if no transmission error has been detected in the current DMA transfer up to this point, or a transmission error has been detected, but the DMA grant is for another DMA channel than the DMA channel participating in the current DMA transfer, then the SSM proceeds until in 606, set up is ready.

Figure 4:
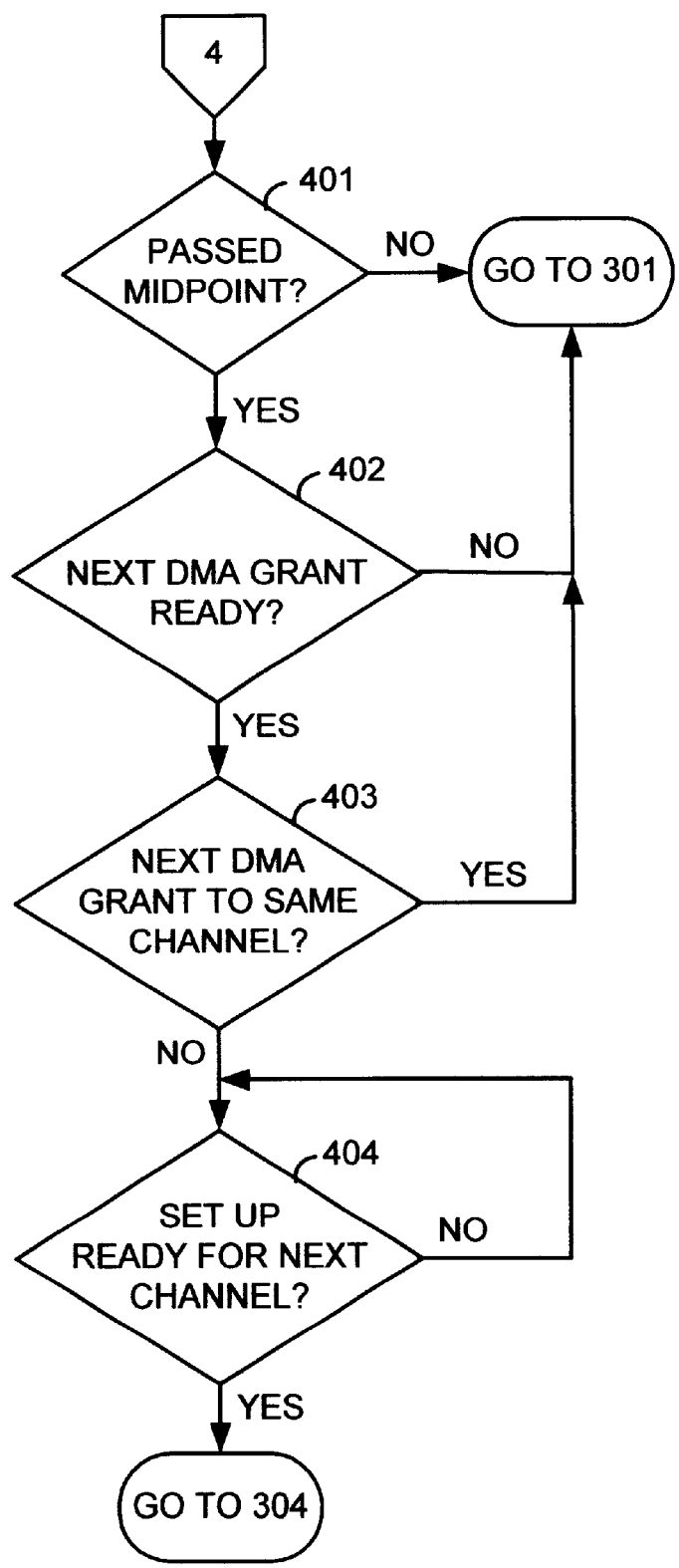

Set up information is kept available for the MSM until either the MSM has completed performing its tasks described in reference to FIGS. 3–5 and initiated the next DMA transfer utilizing the set up information, as determined in 608, or the MSM detects a transmission error in the current DMA transfer and receives a DMA grant corresponding to a pre-request of the current DMA transfer that is for the same DMA channel as the current DMA transfer, as determined in 607. When either of these two cases occurs, the SSM then jumps back to 601 to go back to being idle.

Upon availability of the set up information, an indication that a merger of DMA transfers will occur may also be sent back to a memory controller so that the memory controller can initiate the corresponding read or write operation to a memory participating in the next DMA transfer, before completion of the current DMA transfer. Alternatively, the memory controller may be configured to automatically assume merger will occur until it is informed otherwise by a contrary command or address or other indication. The term "merger" as used herein, means that latency due to set up time is reduced between DMA transfers. In this way, reduction of latency between DMA transfers due to read and write cycle set up time between the memory controller and the memory can be achieved.

Current and next DMA transfers may be through the same DMA channel, or different DMA channels. Since each DMA transfer is limited to a finite length, such as sixteen words, it is especially useful to merge a plurality of such DMA transfers when DMA transfers larger than such finite length are desired through the same DMA channel. It is also useful to merge DMA transfers for different DMA channels to reduce latency between such DMA transfers, thereby increasing the effective data transmission rate.

Figure 7:
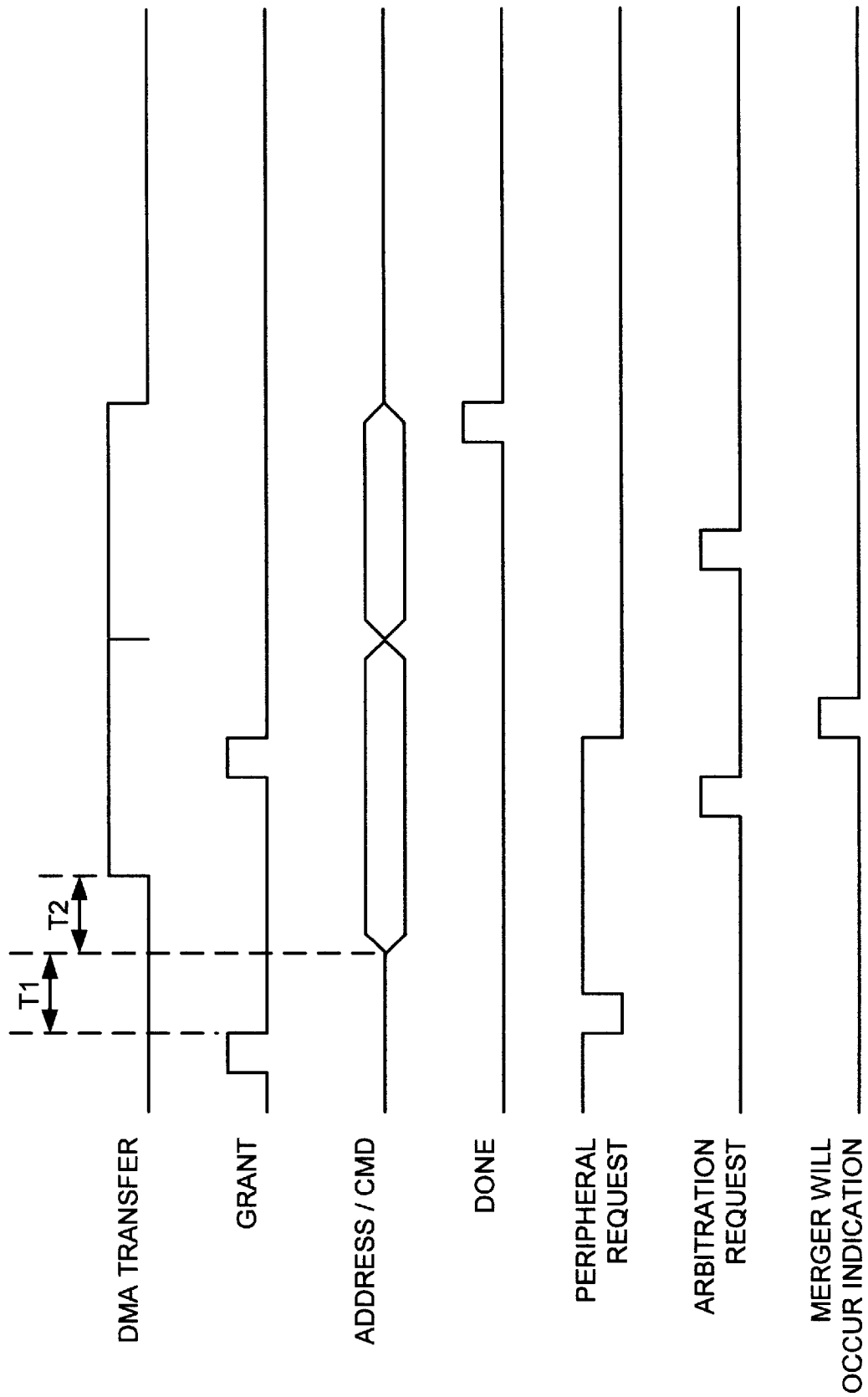
FIG. 7 illustrates, as an example, timing diagrams corresponding to a method for reducing latency due to set up time between same channel DMA transfers, utilizing aspects of the present invention.

FIG. 7 illustrates, as an example, timing diagrams corresponding to a flow diagram of the previously described method for reducing latency due to set up time between same channel DMA transfers. After receiving a first grant for a winning DMA channel from an arbiter, a set up time T1, attributable, for example, to a DMA controller, is required before address and command information is made available to a memory controller that controls a memory participating in the first or current DMA transfer. A second set up time T2 attributable, for example, to the memory and the memory controller, is then required before the current DMA transfer is started from or to the memory.

If a next DMA transfer for the same channel is to be merged with the current DMA transfer, then another peripheral request for the same channel is made for the next DMA transfer by, for example, a peripheral controller interface before completion of the current DMA transfer. This action is illustrated in FIG. 7 by the peripheral request initially being HIGH, then going LOW after such initial request is granted, then going HIGH again to request merger of the current DMA transfer with a next DMA transfer from the same channel, then going LOW again after the second or merger request is granted. After the merger request and before completion of the current DMA transfer, an arbitration request is made, for example, by a DMA controller. Preferably, such an arbitration request is made approximately at a midpoint of each DMA transfer.

After a second DMA grant in response to the arbitration request is received before completion of the current DMA transfer, set up of the next DMA transfer is initiated. Also, an indication that a merger of DMA transfers will occur may be transmitted to the memory controller by, for example, the DMA controller. As previously suggested, this indication is useful, because it allows a conforming memory controller to initiate a read from or write to the memory for the next DMA transfer, before completion of the current DMA transfer, thereby effectively reducing or eliminating the set up time T2 as latency between the current and next DMA transfers. On the other hand, in implementations where the memory controller assumes that merger will occur unless informed otherwise, such merger will occur indication may be used for statistical or other useful purposes.

When the current DMA transfer is completed, if the set up for the next DMA transfer is ready, then the next DMA transfer is initiated at that time, thereby effectively reducing or eliminating the set up time T1 as latency between the current and next DMA transfers. If another DMA transfer is to be merged with this second DMA transfer, then an additional DMA channel request would be made prior to completion of this second DMA transfer. Since no such DMA channel request is made for this second DMA transfer in this example, this second DMA transfer is a last DMA transfer in the present series of merged DMA transfers. When an arbitration request is made during the second DMA transfer, there are no pending requests for the arbiter to arbitrate. Consequently, no DMA grant is issued by the arbiter this time, and no indication that a merger will occur is generated.

Since only two DMA transfers are merged in this example, a "done" or "last address" indication is generated and transmitted to the memory controller right before completion of the second DMA transfer. If more than two DMA transfers were being merged, however, a DMA channel request would be issued during each of the DMA transfers to be merged by one or more DMA channel interfaces, except the last DMA transfer to be so merged. The last DMA transfer includes the "done" or "last address" indication at its tail end to indicate that the current series of merged DMA transfers is ending.

Figure 8:
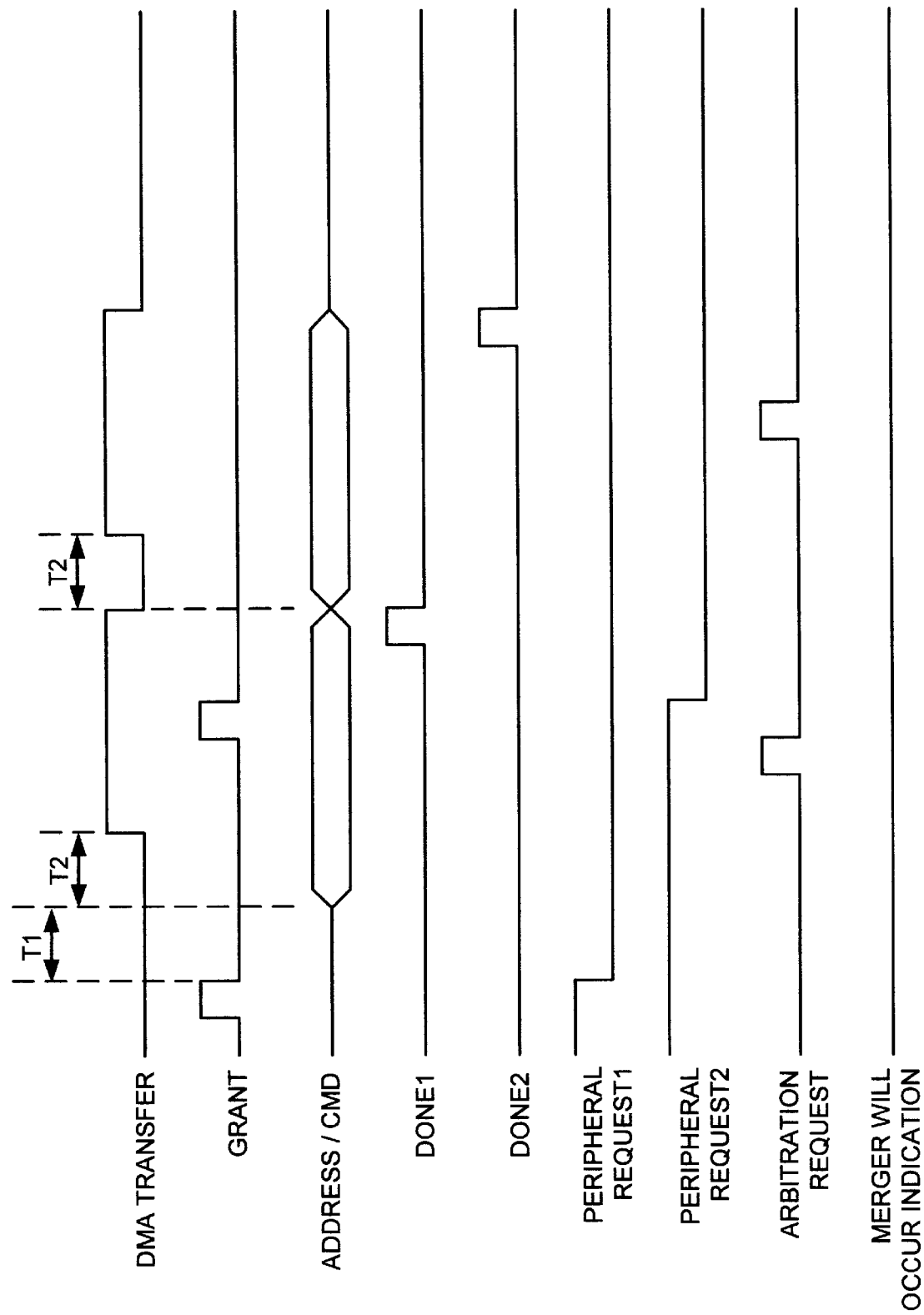
FIG. 8 illustrates, as an example, timing diagrams corresponding to a method for reducing latency due to set up time between different channel DMA transfers, utilizing aspects of the present invention.

FIG. 8 illustrates, as an example, timing diagrams corresponding to a flow diagram of the previously described method for reducing latency due to set up time between different channel DMA transfers. After receiving a first grant for a winning DMA channel (corresponding to peripheral request1) from an arbiter, a set up time T1, attributable, for example, to a DMA controller, is required before address and command information is made available to a memory controller that controls a memory participating in the first or current DMA transfer. A second set up time T2 attributable, for example, to the memory and the memory controller, is then required before the current DMA transfer is started from or to the memory.

If a next DMA transfer from a different channel is to be merged with the current DMA transfer, then a peripheral request for a different DMA channel (corresponding to peripheral request2) is made for the next DMA transfer by, for example, a different peripheral or Ethernet controller interface before completion of the current DMA transfer.

This action is illustrated in FIG. 8 by peripheral request1 and peripheral request2 both initially being HIGH, then peripheral request1 (the arbiter winning request) going LOW after its request is granted while peripheral request2 (the arbiter losing request) stays HIGH, then peripheral request2 going LOW after its request is subsequently granted. As before, an arbitration request is automatically made, for example, by a DMA controller, prior to completion of the current DMA transfer, and preferably, such an arbitration request is made approximately at the midpoint of each DMA transfer, or at a point that is at least sufficiently before the completion of the current DMA transfer so as to ensure that latency between DMA transfers is reduced (in this case, elimination of the set up time T1).

When the current DMA transfer is completed, if the set up for the next DMA transfer is ready, then the next DMA transfer is initiated at that time, thereby effectively reducing or totally eliminating the set up time T1 as latency between the current and next DMA transfers. If another DMA transfer is to be merged with this second DMA transfer, then an additional DMA channel request (either for the same or different channel) would be made prior to completion of this second DMA transfer. In this example, when an arbitration request is made during the second DMA transfer, there are no pending requests for the arbiter to arbitrate. Consequently, the arbiter does not issue a DMA grant this time. Since each of the two DMA transfers are for a different channel, a "done" or "last address" indication is also generated and transmitted to the memory controller right before completion of each of the DMA transfers.

Figure 9:
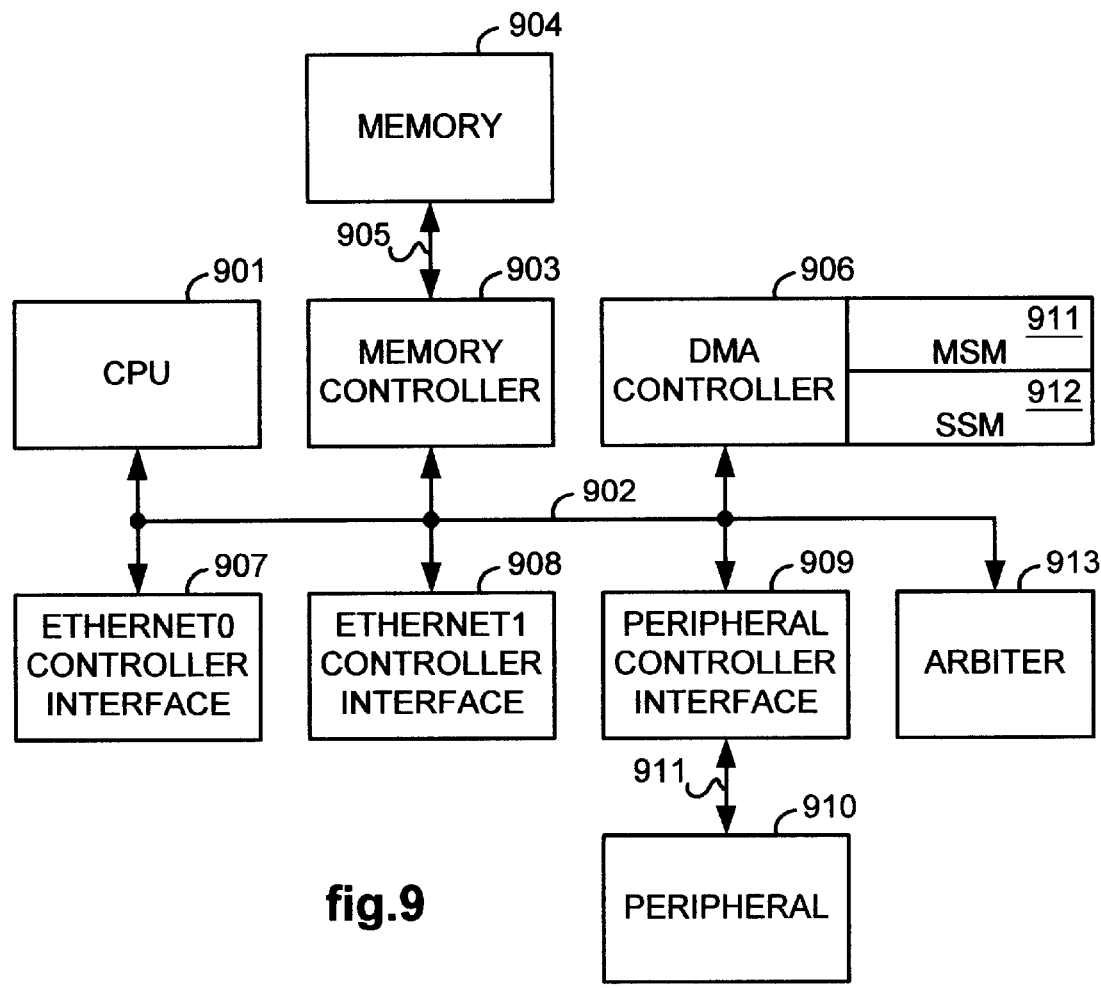
FIG. 9 illustrates, as an example, a block diagram of an apparatus for reducing latency due to set up time between DMA transfers, utilizing aspects of the present invention.

FIG. 9 illustrates, as an example, a block diagram of an apparatus for reducing latency due to set up time between DMA transfers. The apparatus includes a DMA controller 906 having a main state machine 911 generally performing the functions described in reference to FIGS. 3~5, and a secondary or pre-request state machine 912 generally performing the functions described in reference to FIG. 6.

Also included in the apparatus are DMA channel interfaces such as an Ethernet0 Controller Interface 907, Ethernet1 Controller Interface 908, and Peripheral Controller Interface 909. At least one of the DMA channel interfaces, such as the Peripheral Controller Interface 909, participates in merged DMA transfers by generating DMA channel requests before completion of current DMA transfers, as described in reference to FIG. 7, for example, when merging of next DMA transfers are desired.

Also included in the apparatus is an arbiter 913 that arbitrates DMA channel requests from the DMA channel interfaces upon request by the DMA controller 906, and transmits DMA grants for the winning DMA channel requests back to the DMA controller 906. The arbiter 913 in this example is preferably a conventional bus arbiter for the system bus 902.

Also included in the apparatus is a memory 904 participating in the DMA transfers, and a memory controller 903 controlling reading from and writing to the memory 904. The memory controller 903 in this case may participate in merged DMA transfers by receiving indications that mergers will occur from the DMA controller 906, and initiating reading or writing operations with the memory 904 for next DMA transfers before completion of current DMA transfers, in order to reduce latency due to set up time T2 between same channel DMA transfers. In this case, the memory controller may be referred to as being a "conforming" memory controller. Alternatively, the memory controller 906 may be configured to automatically assume that merger of DMA transfers for the same channel will occur unless informed otherwise. This may also be referred to as a "conforming" memory controller, depending upon which convention is selected in the system.

Other components such as a CPU 901 and peripheral 910 are also shown in FIG. 9. All components of FIG. 9 perform their respective conventional functions, including those components that also have special functions added for participating in or performing merged DMA transfers as described above.

Although the various aspects of the present invention have been described with respect to a preferred embodiment, it will be understood that the invention is entitled to full protection within the full scope of the appended claims.

We claim:

1. A method for reducing latency due to set up time between DMA transfers, comprising:
   initiating arbitration of DMA channel requests prior to completion of a current DMA transfer; and
   initiating set up for a next DMA transfer prior to completion of said current DMA transfer according to said arbitration so as to reduce latency due to set up time between said current DMA transfer and said next DMA transfer.

2. The method according to claim 1, wherein said current DMA transfer and said next DMA transfer each comprises a DMA burst of one or more words.

3. The method according to claim 2, wherein said DMA burst includes up to sixteen words.

4. The method according to claim 1, wherein said DMA channel requests include at least one peripheral interface request initiated prior to said initiating arbitration of DMA channel requests.

5. The method according to claim 4, wherein said DMA channel requests include at least one Ethernet interface request.

6. The method according to claim 1, wherein said next DMA transfer is through a same DMA channel as said current DMA transfer.

7. The method according to claim 6, wherein said same DMA channel is associated with a peripheral interface.

8. The method according to claim 7, wherein said DMA channel requests include a request from said peripheral interface that was initiated prior to said initiating arbitration of DMA channel requests.

9. The method according to claim 1, wherein said current DMA transfer and said next DMA transfer are through different DMA channels.

10. The method according to claim 9, wherein said current DMA transfer is through a first DMA channel associated with a first interface, said next DMA transfer is through a second DMA channel associated with a second interface, and said DMA channel requests include a request from at least said second interface that was initiated prior to said initiating arbitration of DMA channel requests.

11. The method according to claim 10, wherein an indication that said current DMA transfer is near completion is transmitted prior to completion of said current DMA transfer.

12. The method according to claim 1, further comprising transmitting an indication to a memory controller that set up for a next DMA transfer is being initiated prior to completion of said current DMA transfer, so as to reduce the effect of read and write cycle latency within a memory managed by said memory controller for said next DMA transfer.

13. The method according to claim 1, further comprising:
   checking for transmission errors during said current DMA transfer; and aborting said current DMA transfer if a transmission error is detected.

14. The method according to claim 13, wherein said aborting said current DMA transfer if a transmission error is detected, comprises:

if said transmission error is detected prior to said initiating set up for a next DMA transfer prior to completion of said current DMA transfer, then aborting said current DMA transfer;

if said transmission error is detected after said initiating set up for a next DMA transfer prior to completion of said current DMA transfer, and if said next DMA transfer is to a same DMA channel as said current DMA transfer, then aborting said current DMA transfer; and if said transmission error is detected after said initiating set up for a next DMA transfer prior to completion of said current DMA transfer, and if said next transfer is to a different DMA channel than said current DMA transfer, then waiting for set up for said next DMA transfer to be completed before proceeding with said next DMA transfer.

15. A method for reducing latency due to set up time between DMA transfers, comprising:

arbitrating pending DMA channel requests before completion of a current DMA transfer;

setting up for a next DMA transfer prior to completion of said current DMA transfer according to said arbitration; and performing said next DMA transfer immediately after completion of said current DMA transfer provided said setting up for said next DMA transfer has completed.

16. The method according to claim 15, wherein said arbitrating pending DMA channel requests before completion of a current DMA transfer occurs during said current DMA transfer at a time so that said setting up for said next DMA transfer completes before said current DMA transfer completes.

17. The method according to claim 15, wherein said arbitrating pending DMA channel requests before completion of a current DMA transfer occurs approximately midway into said current DMA transfer.

18. An apparatus for reducing latency due to set up time between DMA transfers, comprising:

a DMA channel interface providing a series of DMA channel requests such that a DMA channel request for a next DMA transfer is provided by said DMA channel interface before a current DMA transfer is completed; and a DMA controller initiating arbitration of DMA channel requests after said DMA channel request for said next DMA transfer is provided by said DMA channel interface and before said current DMA transfer is completed, and initiating set up for said next DMA transfer prior to completion of said current DMA transfer according to said arbitration so as to reduce latency due to set up time between said current DMA transfer and said next DMA transfer.

19. The apparatus according to claim 18, further comprising:

a memory; and a memory controller controlling data being read from or written to said memory, wherein said DMA controller further provides an indication to said memory controller that set up for said next DMA transfer is being initiated prior to completion of said current DMA transfer, so as to reduce the effect of read and write cycle latency between said memory and said memory controller for said next DMA transfer.

20. The apparatus according to claim 18, wherein said DMA controller comprises:

a main state machine performing said initiating arbitration of DMA channel requests after said DMA channel request for said next DMA transfer is provided by said DMA channel interface and before said current DMA transfer is completed; and a secondary state machine performing said initiating set up for said next DMA transfer prior to completion of said current DMA transfer according to said arbitration so as to reduce latency due to set up time between said current DMA transfer and said next DMA transfer.

21. The apparatus according to claim 20, wherein said main state machine further performs checking for transmission errors during said current DMA transfer, and aborts said current DMA transfer if a transmission error is so detected.

22. The apparatus according to claim 21, wherein said main state machine checks whether said initiating set up for said next DMA transfer-has already been performed after detecting said transmission error, and initiates said next DMA transfer through another DMA channel if said arbitration results in granting a DMA channel request for said another DMA channel and said set up is ready for said next DMA transfer through said another DMA channel.

23. The apparatus according to claim 18, wherein said secondary state machine initiates said set up for said next DMA transfer for a DMA channel after receiving a grant of a DMA channel request for said DMA channel resulting from said arbitration of DMA channel requests and determining that said main state machine is busy at the time.

24. The apparatus according to claim 23, wherein said secondary state machine does not initiate said set up for said next DMA transfer if said main state machine detects a transmission error during said current DMA transfer and said grant of said DMA channel request is for a same DMA channel as said current DMA transfer.

25. An apparatus for reducing latency due to set up time between DMA transfers, comprising:

a first DMA channel interface participating in a current DMA transfer;

a second DMA channel interface providing a DMA channel request for a next DMA transfer before said current DMA transfer is completed; and a DMA controller initiating arbitration of DMA channel requests after said DMA channel request for said next DMA transfer is provided by said second DMA channel interface and before said current DMA transfer is completed, and initiating set up for said next DMA transfer prior to completion of said current DMA transfer according to said arbitration so as to reduce latency due to set up time between said current DMA transfer and said next DMA transfer.

26. The apparatus according to claim 25, further comprising:

a memory; and a memory controller controlling data being read from or written to said memory, wherein said DMA controller further provides an indication to said memory controller that set up for said next DMA transfer is being initiated prior to completion of said current DMA transfer, so as to reduce the effect of read and write cycle latency between said memory and said memory controller for said next DMA transfer.

27. The apparatus according to claim 25, wherein said DMA controller comprises:
- a main state machine performing said initiating arbitration of DMA channel requests after said DMA channel request for said next DMA transfer is provided by said second DMA channel interface and before said current DMA transfer is completed; and
- a secondary state machine performing said initiating set up for said next DMA transfer prior to completion of said current DMA transfer according to said arbitration so as to reduce latency due to set up time between said current DMA transfer and said next DMA transfer.

28. The apparatus according to claim 27, wherein said main state machine further performs checking for transmission errors during said current DMA transfer, and aborts said current DMA transfer if a transmission error is so detected.

29. The apparatus according to claim 28, wherein said main state machine checks whether said initiating set up for said next DMA transfer has already been performed after detecting said transmission error, and initiates said next DMA transfer through a DMA channel associated with said second DMA channel interface if said arbitration results in granting a DMA channel request for said DMA channel and said set up is ready for said next DMA transfer through said DMA channel.

30. The apparatus according to claim 25, wherein said secondary state machine initiates said set up for said next DMA transfer for a DMA channel after receiving a grant of a DMA channel request by said second DMA channel interface resulting from said arbitration of DMA channel requests and determining that said main state machine is busy at the time.

31. The apparatus according to claim 30, wherein said secondary state machine does not initiate said set up for said next DMA transfer if said main state machine detects a transmission error during said current DMA transfer and said grant of said DMA channel request is for a same DMA channel as said current DMA transfer.

* * * * *